United States Patent [19]

Kobayashi et al.

[11] Patent Number: 4,952,243

[45] Date of Patent: Aug. 28, 1990

[54] STATICAL DEMOLITION-FACILITATING AGENT

[75] Inventors: Waichi Kobayashi; Satoshi Otaka; Masaaki Nagai, all of Ube, Japan

[73] Assignee: Ube Industries, Ltd., Yamaguchi, Japan

[21] Appl. No.: 155,030

[22] Filed: May 24, 1988

Related U.S. Application Data

[63] Continuation-in-part of Ser. No. 14,471, Feb. 13, 1987, abandoned.

[30] Foreign Application Priority Data

Feb. 21, 1986 [JP] Japan .................................. 61-35039

[51] Int. Cl.⁵ ......................... C04B 2/02; B02C 19/00
[52] U.S. Cl. ..................................... 106/672; 106/681; 106/792; 106/793; 106/797; 241/1; 423/635
[58] Field of Search ....................... 106/85, 89, 90, 97, 106/98, 118, 119, 120; 241/1; 423/635, 636

[56] References Cited

U.S. PATENT DOCUMENTS

| | | | |
|---|---|---|---|
| 4,316,583 | 2/1982 | Kawano et al. ...................... | 106/118 |
| 4,354,877 | 10/1982 | Kawano et al. ...................... | 106/118 |
| 4,409,030 | 10/1983 | Minegishi et al. ................... | 106/118 |
| 4,600,154 | 7/1986 | Hirota et al. ............................. | 241/1 |
| 4,604,143 | 8/1986 | Suzukawa et al. ................... | 106/118 |
| 4,713,115 | 12/1987 | Sato et al. ............................. | 106/118 |

FOREIGN PATENT DOCUMENTS

| | | | |
|---|---|---|---|
| 59-226084 | 12/1984 | Japan ...................................... | 241/1 |
| 60-125263 | 7/1985 | Japan ...................................... | 241/1 |
| 60-156561 | 8/1985 | Japan ...................................... | 241/1 |
| 61-035039 | 2/1986 | Japan . | |
| 61-291423 | 12/1986 | Japan . | |
| 2129787 | 5/1984 | United Kingdom ................ | 106/118 |

*Primary Examiner*—Mark L. Bell
*Assistant Examiner*—Anthony J. Green
*Attorney, Agent, or Firm*—Finnegan, Henderson, Farabow, Garrett & Dunner

[57] ABSTRACT

A durable structure can be easily and safely demolished by using a demolition-facilitating agent comprising, as an effective principal component 50% to 100% by weight of quick lime particles having an apparent density of 2.0 or more, a weight per unit volume of 1.0 kg/l or more, a particle size of 15 mm or less, and an average particle size of 0.1 mm or more, and optionally, additional solid particles, for example, sand particles, which are inert to water, rigid, porous inorganic grains, for example, hydrated zeolite grains, or a water-absorbing organic material, for example, acrylonitrile-grafted starch in a manner such that the demolition-facilitating agent in the dry state is fed into holes formed in a durable structure to be demolished and then water is fed into the holes to allow the quick lime particles to react with water and thus expand, to demolish the durable structure.

18 Claims, No Drawings

STATICAL DEMOLITION-FACILITATING AGENT

This is a continuation-in-part of application Serial No. 014,471 filed on Feb. 13, 1987, now abandoned.

BACKGROUND OF THE INVENTION

1. Field of the Invention

The present invention relates to a statical demolition-facilitating agent and a method for facilitating the demolition of durable structures by the same. More particularly, the present invention relates to a statical demolition-facilitating agent for durable rigid structures, for example, rocks, rock beds, concrete structures, and brick structures and a method for facilitating the demolition of durable structures by the same in a simple, easy and safe operation within a shortened period of time.

2. Description of the Related Art

It is known that durable rigid structures, for example, rocks, rock beds and concrete structures can be demolished by utilizing an explosive material, for example, dynamite, which exhibits an excellent demolishing effect. However, the utilization of the explosive material is disadvantageous in that an explosion of the material causes environmental problems due to the generation of a tremendous explosive noise, vibration and shock, and the scattering of dust and stones, and furthermore, it is always dangerous.

Also, it is known that where the use of the explosive material is not allowed, the durable rigid structures can be demolished by means of a mechanical demolishing tool using an impact steel ball, an oil hydraulic splitter or a pick hammer. However, the mechanical demolishing tool exhibits a relatively small demolition effect and usually causes an environmental problem due to the generation of tremendous noise, vibration, and dust.

Various attempts have been made to remove the above-mentioned disadvantages of the conventional demolition-facilitating methods, that is, the use of the explosive material and mechanical demolishing tool, by utilizing a statical demolition-facilitating expansible material.

In the statical demolition-facilitating method using the expansible material, a necessary number of holes are formed in a durable rigid structure, for example, a rock, a rock bed or a concrete structure, and are filled with an aqueous slurry of an expansible material, to allow the expansible material in the holes to react with water and to generate a large expanding force which is utilized to demolish the durable rigid structure.

Various types of inorganic expansible materials usable as statical demolition-facilitating materials are known.

For example, U.S. Pat. No. 4,316,583 discloses a statical demolition-facilitating agent comprising a clinker consisting essentially of CaO crystals, $3CaO \cdot SiO_2$ crystals, and $CaSO_4$, the CaO crystals being coated with the $3CaO \cdot SiO_2$ crystals to control the hydration rate of the CaO crystals.

U.S. Pat. No. 4,713,115 discloses a statical demolition-facilitating agent comprising a clinker consisting essentially of CaO crystals and calcium aluminoferrite crystals.

U.S. Pat. No. 4,354,877 discloses a statical demolition-facilitating agent comprising hard burnt quick lime and a cement.

U.S. Pat. No. 4,604,143 discloses a statical demolition-facilitating agent comprising a CaO crystal-$3CaO \cdot SiO_2$ crystal-containing clinker and gypsum.

Japanese Unexamined Patent Publication (Kokai) No. 59-226084 discloses a statical demolition-facilitating agent comprising molded CaO.

The afore-mentioned known statical demolition-facilitating agents are disadvantageous in that the demolition force generated by the statical demolition-facilitating agents is very small and, therefore, a long time of, for example, 16 to 48 hours is necessary to complete the demolition of the durable rigid structure, but they are advantageous in that they do not cause any environmental problems, such as the generation of tremendous noise and vibration and the scattering of dust and stones.

In order to shorten the demolishing time necessary to complete the demolition, attempts have been made to enhance the hydration reactivity of the statical demolition-facilitating agent. However, where the holes formed in the durable rigid structures to be demolished are filled with an aqueous slurry containing the statical demolition-facilitating agent which has an enhanced hydration reactivity, the statical demolition-facilitating agent rapidly and violently reacts mid water, and this rapid, violent reaction often causes the resultant reaction product and the remaining aqueous slurry to spout from the holes. This phenomenon is a so-called spouting phenomenon, and results in a wasteful consumption of the statical demolition-facilitating agent.

In the conventional statical demolition-facilitating agent, the hydration reaction and expansion rate thereof closely depends on the temperature of the aqueous slurry. Accordingly, it is necessary to provide several different types of demolition-facilitating agents corresponding to different atmospheric temperatures, for example, a type of demolition-facilitating agent useful in the summer, another type of demolition-facilitating agent useful in the winter, and still another type of demolition-facilitating agent useful in the spring and autumn. If a demolition-facilitating agent which can be used in a specific season is used in another season, for example, a demolition-facilitating agent appropriate for spring and autumn is used in the summer, the resultant aqueous slurry will often spout from the holes. In another example, when a demolition-facilitating agent suitable for the spring and autumn is used in the winter, the demolishing time necessary to complete the desired demolition becomes very long. Due to the above-mentioned dependency on the temperature, it is necessary to provide plural types of statical demolition-facilitating agents having different appropriate use temperatures. This necessity brings an economical disadvantage and complicates the selection of an adequate statical demolition-facilitating agent from various types thereof.

In the conventional method for facilitating the demolition of the durable structures, a conventional demolition-facilitating agent is mixed with and suspended in water and the resultant aqueous slurry of the conventional demolition-facilitating agent is fed into holes formed in the durable structures.

In the preparation of the aqueous slurry, it is necessary to accurately measure or weigh the amounts of the demolition-facilitating agent and water to be mixed. Also, a stirrer is necessary to prepare the aqueous slurry in which the demolition-facilitating agent is evenly disposed. When the demolition is carried out on a large scale, it is necessary to transport and feed the aqueous slurry from an aqueous slurry tank to the holes in the durable structures by means of a pump. That is, the practical use of the conventional demolition-facilitating agent is laborious, and therefore, there is a need for a new type of demolition-facilitating agent which can be practically employed in a simple, easy, and safe operation.

SUMMARY OF THE INVENTION

An object of the present invention is to provide a demolition-facilitating agent which can generate a very high expansion pressure and facilitate a demolition of durable structures in a simple, easy, and safe operation within a shortened period of time without the occurrence of spouting, and a method for facilitating the demolition of durable structures by the same.

Another object of the present invention is to provide a demolition-facilitating agent which is insensitive to environmental air temperature and can be practically employed at all environmental air temperatures, and a method for facilitating the demolition of durable structures by the same.

Still another object of the present invention is to provide a demolition-facilitating agent which can be practically employed with an enhanced economical efficiency without preliminarily preparing an aqueous slurry thereof, and a method for facilitating the demolition of durable structures by the same.

The above-mentioned objects can be attained by the present invention.

The statical demolition-facilitating agent of the present invention comprises, as an effective principal component, quick lime particles having an apparent density of 2.0 or more, a unit volume weight of 1.0 kg/l or more, a particle size of 15 mm or less, and an average particle size of 0.1 mm or more.

The method for facilitating the demolition of durable structures comprises filling at least one hole formed in a durable structure with a statical demolition-facilitating agent comprising, as an effective principal component, quick lime particles having an apparent density of 2.0 or more, a unit volume weight of 1.0 kg/l or more, a particle size of 15 mm or less, and an average particle size of 0.1 mm or more, in the dry state; and feeding water into the hole filled by the dry demolition-facilitating agent to allow the quick lime particles to react with the water, by expanding, and thus to demolish the durable structure.

DESCRIPTION OF THE PREFERRED EMBODIMENTS

Generally, free lime solid particles in a statical demolition facilitating agent react with water and are converted to calcium hydroxide particles in accordance with the chemical equation:

$$CaO + H_2O = Ca(OH)_2 + 15.3 \text{ kcal}$$

During the above-mentioned conversion, the volume of the solid particles in the reaction system increases to about twice the original volume. Also, the above-mentioned reaction is exothermic. Therefore, during the reaction, the temperature of the reaction system is quickly elevated and a portion of water which is nonreacted with the free lime or is in excess is rapidly vaporized. This phenomenon causes the pressure in the reaction system to rapidly increase. When the reaction is carried out within a restricted space, for example, a hole, and the increased pressure of the water vapor in the reaction system reaches a limited level, at least a portion of the reaction system is spouted from the restricted space.

To prevent the undesirable spouting phenomenon of the conventional demolition-facilitating agent, it was necessary to strictly control the hydration reaction rate to a appropriate level and to prevent the rapid temperature increase of the reaction system.

The above-mentioned undesirable spouting phenomenon does not occur in the demolition-facilitating agent of the present invention, because when water is brought into contact with the quick lime solid particles in the demolition facilitating agent of the present invention, the generated water vapor can be easily exhausted from the restricted space through fine passages formed between the solid particles.

As stated above, when the conventional demolition-facilitating agent is used and the rapid hydration reaction is strictly restricted to avoid the spouting phenomenon, the expansion of the solid particles and the generation of the expansion pressure is slowly effected. That is, the demolition rate of the durable structure varies on the environmental air temperature and is relatively low.

However, since a spouting phenomenon does not occur, the temperature of the hydration reaction system containing the demolition-facilitating agent of the present invention can be rapidly elevated and the quick lime particles can rapidly expand without any disadvantage, to complete the demolition of the durable structure within a short time.

Also, the demolition-facilitating agent of the present invention can exhibit a satisfactory demolition effect at a wide range of temperature of from about −10° C. to 50° C., because the temperature of the hydration reaction system can be rapidly elevated without the necessity of restriction and, therefore, the expansion of the quick lime particles is effected at a very high rate independently of the environmental air temperature.

The demolition-facilitating agent of the present invention comprises an effective principal component consisting of quick lime particles which have an apparent density of 2.0 or more, preferably 2.4 to 3.2, a unit volume weight (bulk density) of 1.0 kg/l or more, preferably 1.2 to 1.8 kg/l, a particle size of 15 mm or less, preferably 12 mm or less, more preferably 1 to 5 mm, and an average particle size of 0.1 mm or more, preferably 0.5 to 10 mm, more preferably 1 to 3 mm.

A preferred embodiment according to the present invention is a statical demolition facilitating agent consisting essentially of quick lime particles containing inevitable impurities in a limited amount of 5% by weight or less, and having an apparent density of 2.0 or more, a unit volume weight of 1.0 kg/l or more, a particle size of 15 mm or less and an average particle size of 0.1 mm or more.

When the quick lime particles have an apparent density of less than 2.0 and/or a unit volume weight of less than 1.0 kg/l, the resultant demolition-facilitating agent exhibits an unsatisfactory expansion pressure, and thus demolition effect, in a restricted space, for example, a hole formed in a durable structure.

Also, very fine quick lime particles having a small average particle size of less than 0.1 mm and a small unit volume weight of less than 1.0 kg/l, exhibit a very high reaction rate and expansion rate. Therefore, where the demolition-facilitating agent in the form of a dry powder is charged into a hole formed in a durable structure and then water is fed into the hole, the quick lime fine particles are rapidly reacted with water and rapidly expand so as to block the flow of water through the hole. That is, the expansion of the demolition-facilitating agent occurs only in an upper portion of the hole but not in a lower portion thereof.

There is no specific lower limit to the particle size of the quick lime particles. However, preferably the quick lime particles have a particle size of 0.05 mm or more but not exceeding 15 mm to avoid blockages in the water-flow. Also, preferably the particle size of the quick lime particles is 1/6 or less of the diameter of a hole formed in a durable structure to be demolished. When the demolition-facilitating agent containing large quick lime particles having a particle size of more than 1/6 the diameter of the hole is charged into the hole, the large quick lime particles sometimes form a block in the hole and stop the flow of the particles through the hole.

When produced from a industrial raw lime material, the resultant quick lime particles contain inevitable impurities, for example, $SiO_2$, $Al_2O_3$, and/or $Fe_2O_3$. Preferably, the total amount of the inevitable impurities in the quick lime particles is 5% by weight or less, more preferably 2% by weight or less.

In the demolition-facilitating agent of the present invention, the principal component preferably consists of two or more groups of quick lime particles having a different range of particle size.

That is, the principal component preferably consists of 50% to 80% by weight of a group of quick lime particles having a particle size ranging from 2.5 to 5 mm and 20% to 50% by weight of another group or groups of quick lime particles having a particle size ranging from 0.6 to 1.2 mm. The two or more groups of the quick lime particles having different particle sizes are effective for providing an increased filling density thereof in the holes formed in the durable structure to be demolished.

The two or more groups of the quick lime particles may have a different apparent density and/or unit volume weight.

That is, the principal component may consist of 50% to 80% by weight of a group of quick lime particles having an apparent density of 1.3 to 1.6 and 20% to 50% by weight of another group or groups of quick lime particles having an apparent density of 1.0 to 1.3.

Alternately, the principal component may consist of 50 to 80% by weight of a group of quick lime particles having a unit volume weight of 1.0 to 1.3 kg/l and 20% to 50% by weight of another group or groups of quick lime particles having a unit volume weight of 1.3 to 1.6 kg/l.

The demolition-facilitating agent of the present invention contains the quick lime particles in a content of 50% by weight or more, preferably 75% by weight or more.

The demolition-facilitating agent of the present invention may contain, in addition to 50% by weight or more of the quick lime particles, 50% by weight or less, preferably 25% by weight or less, of an additional component consisting of at least one type of additional solid particles which are substantially inert to water and have a particle size of 15 mm or less, preferably, 12 mm or less and an average particle size of 0.1 mm or more, preferably 0.5 mm or more.

The additional solid particles may be selected from the group consisting of sand particles, milled rock particles, for example, milled granite and limestone particles, and milled concrete particles, which are non-reactive to water and have a high rigidity and hardness.

The particle size, average particle size, apparent density and/or unit volume weight of the additional solid particles are preferably controlled so that the additional particles are evenly distributed between the quick lime particles, and the resultant demolition-facilitating agent exhibits an adequate filling density and a satisfactory demolition effect when used.

The content of the additional solid particles in the demolition-facilitating agent of the present invention is limited to 50% by weight or less. When this content is more than 50% by weight, the resultant demolition-facilitating agent will exhibit an unsatisfactory demolition effect.

The demolition-facilitating agent of the present invention may contain, in addition to the principal component, 0.5% to 50%, based on the weight of the principal component, of an additional porous component consisting of at least one type of rigid, porous inorganic grains having a maximum grain size of 12 mm and an average grain size of 0.5 mm or more.

The rigid porous inorganic grains are substantially insoluble in water, can absorb water wherein, can desorb water therefrom, and preferably, have a bulk specific gravity of 0.1 or more. The rigid, porous inorganic grains are preferably selected from the group consisting of dehydrated zeolite and silica gel grains, which have a specific structure capable of absorbing and desorbing water, and cordierite grains which have large pores formed in the crystalline structure thereof and can temporarily retain water in the pores.

Also, the rigid, porous inorganic grains may be sintered clay porous grains or hardened cement porous grain.

The rigid porous inorganic grains should be sufficiently resistant to an expansion pressure generated in the demolition-facilitating agent during the demolition procedure. When the bulk specific gravity is less than 1, the resultant porous inorganic grains exhibit a poor mechanical strength and when placed together with the principal component in a hole formed in a durable structure, and water is fed into the hole, the porous inorganic grains move up to the surface of water and are separated from the principal component. Accordingly, the porous inorganic grains having a bulk specific gravity less than 1 is not preferable for the demolition-facilitating agent of the present invention.

When the porous inorganic grains having a maximum grain size of 12 mm are used, it becomes difficult to evenly charge the demolition-facilitating agent into the hole.

When the porous inorganic grains are used in a small amount of less than 0.5%, the increase in statical expansion pressure of the resultant demolition-facilitating agent is unsatisfactory. A large amount of porous inorganic grains of more than 50% causes a reduction in the statical expansion pressure of the resultant demolition-facilitating agent.

Also, an average size of the porous inorganic grains of less than 0.5 mm sometimes causes an undesirable spouting of the demolition-facilitating agent slurry in the hole, as mentioned hereinbefore.

The statical demolition-facilitating agent of the present invention may contain, in addition to the principal component, 0.01% to 2%, based on the weight of the principal component, of a water-absorbing organic material consisting of at least one type of water-absorbing organic polymer material.

The water-absorbing organic polymer material may be selected from the group consisting of acrylonitrile-grafted starches, polyacrylic acid resins, acrylic acid-grafted starches, and cross-linked polyvinyl alcohol resins which are water-insoluble and capable of absorbing a large amount of water.

When the water-absorbing organic material is used in a small amount of less than 0.01%, the increase in the demolition effect of the resultant demolition-facilitating agent is unsatisfactory. Also, when the water-absorbing organic material is used in a large amount of more than 2% or more, the amount of water absorbed by the water-absorbing organic material becomes excessively large, and thus the reaction of quick lime particles with water is restricted so that the resultant statical expansion pressure becomes insufficient.

The above-described specific statical demolition-facilitating agent is produced by a process wherein a raw lime material, for example, comprising at least one member selected from calcium carbonate, calcium hydroxide and calcium oxide, is sintered at a temperature of 1000° C. or more, preferably 1200° C. or more, more preferably from 1400° C. to 2000° C., and then the resultant quick lime is adjusted to the form of particles having an apparent density of 2.0 or more, a unit volume weight of 1.0 kg/l or more, a particle size of 15 mm or less, and an average particle size of 0.1 mm or more.

The raw lime material to be sintered may be in the form of pellets, grains, granules or particles having a desired size. The raw lime material in the form of pellets may be prepared by pelletizing a raw lime material powder.

The sintering operation is usually carried out by means of a rotary kiln. The sintering temperature and time is variable depending on the type and production place of the raw lime material and the type of sintering method.

The raw lime material may contain a small amount of a flux, for example, fluorite, to ease the sintering operation.

Where a rotary kiln is employed for the sintering operation, the raw lime material and the resultant quick lime are moved through the rotary kiln while being rotated along the inside wall surface of the kiln, and therefore, the resultant quick lime particles have relatively smooth rounded surfaces. This type of quick lime particle can be easily and evenly charged into restricted spaces, for example, holes, formed in a durable structure, and therefore, can create a uniform and large expansion pressure in the restricted spaces.

The resultant quick lime particles are pulverized and/or screened to adjust the apparent density, unit volume weight, particle size, and average particle size thereof to desired levels.

The quick lime particles are optionally mixed with an amount of the additional component, the additional porous component, and/or the water-absorbing organic material.

In the method of the present invention for facilitating the demolition of a durable structure, at least one restricted space, for example, a hole, is formed within a durable structure; the hole is filled with a dry statical demolition-facilitating agent comprising an effective principal component consisting of quick lime particles having an apparent density of 2.0 or more, a unit volume weight of 1.0 kg/l or more, a particle size of 15 mm or less, and an average particle size of 0.1 mm or more; and then water is fed into the hole to allow the dry quick lime particles in the hole to react with water and thus expand, and accordingly, demolish the durable structure.

The hole usually has a diameter of from 20 mm to 90 mm and a depth of from 0.3 m to 10 m.

With respect to the demolition-facilitating agent of the present invention, it is important that the quick lime particles as an effective principal component have an apparent density of 2.0 or more, a unit volume weight (bulk density) of 1 kg/l or more, a particle size of 15 mm or less, and an average particle size of 0.1 mm or more.

The quick lime particles in the above-mentioned specific form can be easily and smoothly charged into a restricted space, for example, holes, formed in a durable structure and form a number of capillary channels connected to each other and to the outside of the hole between the particles. When water is fed into the hole, the water can smoothly flow along the capillary channels and react with the quick lime particles while creating a reaction heat. When the reaction heat causes a portion of the water to be rapidly vaporized, the resultant water vapor can be smoothly discharged through the capillary channels without an undesirable spouting phenomenon.

Accordingly, the demolition-facilitating agent of the present invention can be directly charged in a dry particle form into the hole without being converted into an aqueous slurry thereof before the charging. Also, it is unnecessary to restrict the reaction rate of the quick lime particles with water in the hole. Further, the quick lime particles can quickly reacted with water and can rapidly expand. This feature results in a quick demolition of the durable structure.

Furthermore, the demolition-facilitating agent of the present invention can react with water while generating a high temperature in the hole without spouting, and therefore, can be safely employed at any environmental air temperatures at a high efficiency.

The present invention will be further explained by way of specific examples, which, however, are representative and do not restrict the scope of the present invention in any way.

EXAMPLE 1

The limestones produced in Isa Limestone Mine, Yamaguchi, Japan and having a chemical composition shown in the Table 1 were used as a raw lime material. The limestones were milled into particles having a size of from 1 to 5 mm. The limestone particles were sintered by means of an electric furnace at a temperature of 1500° C. for 20 minutes.

The resultant quick lime particles were screened to collect quick lime particles having an apparent density of 2.7, a unit volume weight of 1.3 kg/l a particle size of from 1 to 4.5 mm and an average particle size of 2.5 mm.

The quick lime particles were used as a demolition-facilitating agent.

A carbon steel pipe having an outside diameter of 48 mm, an inside diameter of 40 mm and a length of 600 mm, and provided with a closing bottom, was filled with the demolition-facilitating agent up to the upper opening of the pipe. Then, water was fed into the pipe up to the level of the upper opening of the pipe.

The expansion pressure created in the pipe was determined by measuring an amount of strain created on two strain gauges attached onto the outer surface of the middle portion of the middle portion of the pipe in such a manner that the strain gauges face each other through the pipe.

The measured expansion pressure was as shown in Table 2.

EXAMPLE 2

The same procedures as those described in Example 1 were carried out except that the sintering procedure was carried out at a temperature of 1200° C for 20 minutes and the resultant screened quick lime particles had an apparent density of 2.0, a unit volume weight of 1.0 kg/l a particle size of from 1 to 4.5 mm, and an average particle size of 2.5 mm.

The result of the expansion pressure test was as indicated in Table 2.

EXAMPLE 3

The same procedures as those described in Example 1 were carried out except that the sintering procedure was carried out at a temperature of 1750° C. for 20 minutes and the resultant screened quick lime particles had an apparent density of 3.2 and a unit volume weight of 1.6 kg/l a particle size of 1 to 4.5 mm, and an average particle size of 2.5 mm.

The result of the expansion pressure test was as shown in Table 2.

EXAMPLE 4

Limestones containing sand and clay and having the chemical composition as shown in Table 1 were used as a raw lime material.

The limestones were milled to produce particles having a size of 5 mm or less, and then sintered by means of an electric furnace at a temperature of 1500° C. for 20 minutes.

The resultant quick lime particles were screened to collect quick lime particles having an apparent density of 2.8, a unit volume weight of 1.4 kg/l a particle size of from 1 to 4.5 mm, and an average size of 2.5 mm.

The result of the expansion pressure test is shown in Table 2.

EXAMPLE 5

The same limestones as described in Example 1 were pulverized into a specific surface area of 5000 cm$^2$/g determined in accordance with a Blaine permeability method. The resultant limestone powder was granulated into tablets having a diameter of 4 mm and a thickness of 2 mm by means of a tablet-forming machine.

The limestone tablets were sintered at a temperature of 1000° C. for 30 minutes by means of an electric furnace.

The resultant quick lime particles had an apparent density of 2.1, a unit volume weight of 1.1 kg/l, an average particle size of 3 mm.

The resultant of the expansion pressure test was as shown in Table 2.

COMPARATIVE EXAMPLE 1

The same quick lime particles as those described in Example 1 were pulverized by means of a ball mill into fine particles having an average size of 0.08 mm, an apparent density of 2.7 and a unit volume weight of 1.3 kg/l.

When the fine quick lime particles were subjected to the same expansion pressure test as that described in Example 1, the fine particles violently reacted with water and spouting of the fine particle-water mixture was observed. Accordingly, it was impossible to determine the expansion pressure of the fine quick lime particles.

EXAMPLE 6

The same quick lime particles as those described in Example 1 is an amount of 100 parts by weight were uniformly mixed with 100 parts by weight of sand having an average particle size of 0.2 mm.

The resultant statical demolition-facilitating agent was subjected to the same expansion pressure test as that described in Example 1.

The result of the test was as shown in Table 2.

TABLE 1

| | Chemical composition (wt. %) | | | | | | | | |
|---|---|---|---|---|---|---|---|---|---|
| | Ig. loss | SiO$_2$ | Al$_2$O$_3$ | Fe$_2$O$_3$ | CaO | MgO | Na$_2$O | K$_2$O | Total |
| Limestone in Isa Mine, Yamaguchi-ken | 43.73 | 0.08 | 0.01 | 0.02 | 55.68 | 0.33 | 0.04 | 0.02 | 99.91 |
| Limestone containing sand and clay | 42.70 | 1.13 | 0.55 | 0.60 | 54.36 | 0.32 | 0.12 | 0.09 | 99.87 |

TABLE 2

| | Expansion pressure (kg/cm$^2$) | | | Increase in temperature (°C.) | Remarks |
|---|---|---|---|---|---|
| Example | 5 minutes after | 10 minutes after | 20 minutes after | | |
| Example 1 | 370 | 430 | 450 | 110 | No spouting |
| Example 2 | 300 | 300 | 300 | 120 | No spouting |
| Example 3 | 160 | 350 | 460 | 85 | No spouting |
| Example 4 | 250 | 290 | 300 | 105 | No spouting |
| Example 5 | 310 | 330 | 330 | 120 | No spouting |
| Example 6 | 200 | 290 | 300 | 70 | No spouting |

Note: Test temperature 5° C.

EXAMPLE 7

The same limestones as described in Example 1 were supplied into a rotary kiln having an inside diameter of 0.75 m and a length of 18 m at a supply rate of 500 kg/hour, and sintered therein at a temperature of 1500° C. for a residing time of 150 minutes. The resultant quick lime particles were delivered from the rotary kiln at a delivery rate of about 250 kg/hour.

The resultant quick lime particles had an apparent density of 2.7, a unit volume weight of 1.4 kg/l a particle size of from 1 to 4.5 mm, and an average size of 2.0 mm.

The quick lime particles were employed as a demolition-facilitating agent.

On a bench floor formed in a limestone-mining stope by means of a bench-cut method, ten vertical holes each having a diameter of 65 mm and a depth of 3 m were dug at intervals of 1 m, that is, at a resistance of 1 m.

The hole were filled with the dry demolition-facilitating agent up to the levels of upper opening thereof, and then water was poured into the holes up to the levels of the upper openings thereof at an environmental air temperature of 5° C. Five minutes after the completion of the water-pouring procedure, a number of cracks were formed in the bench floor and 10 minutes after the completion of the water-pouring procedures, the cracks were extended to a length of 10 to 30 mm. The cracked bench floor was easily secondarily divided by means of a backhoe.

During the demolition-facilitating procedure, no spouting was observed and the demolition of the bench floor was safely and smoothly completed, even though the environmental air atmosphere was at a low temperature of 5° C.

COMPARATIVE EXAMPLE 2

A conventional demolition-facilitating agent comprising 80% by weight of CaO crystals, and 10% by weight of $3CaO.SiO_2$ crystals and having an apparent density of 2.8, and an average particle size of 0.02 mm was dispersed in water in an amount of 30% based on the weight of the demolition-facilitating agent to provide an aqueous slurry.

The aqueous slurry was applied to the same demolition procedures as those described in Example 7.

A first crack was formed in the bench floor 24 hours after the completion of the aqueous slurry-pouring procedure. Then, 40 hours after the completion of the aqueous slurry-pouring procedure, a number of cracks reached a length of 10 to 20 mm and it became possible to secondarily divide the cracked bench floor by means of a backhoe. These demolition procedures was carried out at an environmental air temperature of 5° C.

EXAMPLES 8 TO 13

In each of Examples 8 to 13, the same limestones as that described in Example 1 were sintered at a feeding rate of 500 kg/hour in a rotary kiln having an inside diameter of 0.75 m and a length of 18 m at a sintering temperature of 1500° C. for a retaining time of 150 minutes, and quick lime particles were produced at a rate of 250 kg/hour. The quick lime particles had a bulk specific gravity of 2.7 and were composed of 20% by weight of a small particle fraction having a size of from 0.6 to 1.2 mm, 30% by weight of a medium particle fraction having a size of from 1.2 to 2.4 mm, and 50% by weight of a large particle fraction having a size of from 2.4 to 4.8 mm.

A statical demolition-facilitating agent was prepared by mixing 100 parts by weight of the quick lime particles with 1 part by weight in Example 8, 2 parts by weight in Example 9, 5 parts by weight in Example 10, 10 parts by weight in Example 11, 20 parts by weight in Example 12 or 40 parts by weight in Example 13, of silica gel grains having a grain size of from 2.4 to 4.8 mm.

The resultant demolition-facilitating agent was subjected to a expansion pressure test. This test was carried out by filling a vertical carbon steel pipe having an outside diameter of 48.6 mm, a schedule of 80, and a length of 500 mm and closed by a steel plate having a width and length of 80 mm, with the demolition-facilitating agent up to the upper open end of the pipe, and water was then fed into the pipe up to the level of the upper open end of the pipe. The expansion pressure created in the pipe was determined in the same manner as described in Example 1. Also, a thermocouple was inserted into a middle portion of the pipe to measure an increase in temperature of the demolition-facilitating agent slurry in the pipe.

The results are indicated in Table 3.

EXAMPLES 14 TO 17

In each of Examples 14 to 17, the same procedures as those described in Example 8 were carried out except that the silica gel grains were replaced by 5 parts by weight of dehydrated natural zeolite grains having a grain size of 2.4 to 4.8 mm and a bulk specific gravity of 1.5 and produced in Futatsui, Akita, Japan, in Example 14, by 5 parts by weight of synihetic cordierite grains having a bulk specific gravity of 1.3 in Example 15, by 5 parts by weight of heat-insulating crashed break grains consisting of a sintered clay and having a bulk specific gravity of 1.2 in Example 16, or by 5 parts by weight of crushed hardened cement grains having a bulk specific gravity of 1.3 in Example 17.

The results are shown in Table 3.

TABLE 3

| Example No. | Expansion pressure (kgf/cm$^2$) | | | Increase in temperature (°C.) |
|---|---|---|---|---|
| | 5 minutes after | 10 minutes after | 20 minutes after | |
| Example 8 | 360 | 440 | 490 | 140 |
| Example 9 | 370 | 600 | 700 | 140 |
| Example 10 | 380 | 810 | 930 | 130 |
| Example 11 | 380 | 810 | 930 | 130 |
| Example 12 | 350 | 570 | 630 | 120 |
| Example 13 | 280 | 440 | 500 | 120 |
| Example 14 | 290 | 550 | 620 | 120 |
| Example 15 | 290 | 530 | 600 | 130 |
| Example 16 | 280 | 520 | 600 | 130 |
| Example 17 | 280 | 540 | 610 | 130 |

EXAMPLES 18 TO 21

In each of Examples 18 to 21, the same procedures as those described in Example 8 were carried out except that the silica gel grains were replaced by 0.02 parts by weight in Example 18, 0.1 parts by weight in Example 19, 0.5 parts by weight in Example 20, or 1.5 parts by weight in Example 21, of a water-absorbing organic material consisting of an acrylic acid-vinyl alcohol copolymer (trade mark: Sumika gel S-50, made by Sumitomo Chemical Co.).

The results are shown in Table 4.

EXAMPLE 22

The same procedures as those described in Example 8 were carried out, except that 0.5 parts by weight of the same water-absorbing organic material as mentioned in Example 18 were added to the same mixture of the quick lime particles and the silica gel grains as described in Example 8, and the pipe having a schedule of 80 was replaced by a pipe having a schedule of 160.

The results are shown in Table 4.

EXAMPLE 23

Silica gel grains having a size of 2.4 to 4.8 mm in an amount of 40 g were placed in a lower portion of the same pipe as described in Example 8, and then 800 g of the same quick lime particles as described in Example 8 were placed on the silica gel grain layer, and 250 ml of water was fed into the pipe.

The results are shown in Table 4.

EXAMPLE 24

The same procedures as described in Example 23 were carried out except that the silica gel grains were replaced by 4 g of the same water-absorbing organic material as described in Example 18 and 240 ml of water were fed into the pipe.

The results are shown in Table 4.

TABLE 4

| Example | Expansion pressure (kgf/cm$^2$) | | | Increase in temperature (°C.) |
|---|---|---|---|---|
|  | 5 minutes after | 10 minutes after | 20 minutes after |  |
| Example 18 | 360 | 450 | 490 | 140 |
| Example 19 | 380 | 760 | 870 | 130 |
| Example 20 | 370 | 700 | 800 | 130 |
| Example 21 | 350 | 490 | 540 | 130 |
| Example 22 | 390 | 980 | 1180 | 130 |
| Example 23 | 360 | 790 | 880 | 130 |
| Example 24 | 370 | 780 | 860 | 130 |

EXAMPLE 25

Five vertical holes each having a diameter of 40 mm and a length of 1 m were dug at intervals of 60 m in one row in a middle portion of a granite rock having a width of 3 m, a length of 3 m and a height of 1.2 mm. The same demolition-facilitating agent as described in Example 10 was fed into the holes up to the open ends of the holes and then, water was fed into the hole up to the level of the open end thereof at an environmental air temperature of 15° C. About 8 minutes after the completion of the above-mentioned water-feeding procedure, a number of cracks were formed on the rock and about 15 minutes after the completion of the water-feeding procedure, the cracks were extended to a length of 10 to 20 mm, and the rock was divided into two pieces.

We claim:

1. A statical demolition-facilitating agent consisting essentially of, as an effective principal component, quick lime particles having an apparent density of 2.0 or more, a unit volume weight of 1.0 kg/l or more, a particle size of 15 mm or less, and an average particle size of 0.1 mm or more, and 0.5% to 50%, based on the weight of the principal component, of rigid, porous inorganic grains having a maximum grain size of 12 mm and an average grains size of 0.5 mm or more, said rigid, porous inorganic grains selected from the group consisting of dehydrated zeolite grains, silica gel grains, cordierite grains, sintered clay porous grains, hardened cement porous grains and mixtures thereof.

2. The statical demolition-facilitating agent as claimed in claim 1, further consisting essentially of, in addition to the principal component, 50% by weight or less of an component consisting of additional solid particles which are substantially inert to water and have a particle size of 15 mm or less and an average particle size of 0.1 mm or more, said water inert solid particles are selected from the group consisting of sand particles, milled rigid rock particles, milled concrete particles and mixtures thereof.

3. The statical demolition-facilitating agent as claimed in claim 1, wherein the quick lime particles are in a content of 50% by weight or more.

4. The statical demolition-facilitating agent as claimed in claim 3, further consisting essentially of, in addition to the principal component, 50% by weight or less of an component consisting of additional solid particles which are substantially inert to water and have a particle size of 15 mm or less and an average particle size of 0.1 or more, said water inert solid particles are selected from the group consisting of sand particles, milled rigid rock particles and milled concrete particles and mixtures thereof.

5. The statical demolition-facilitating agent as claimed in claim 1, wherein the quick lime particles have inevitable impurities in a limited amount of 5% by weight or less.

6. The statical demolition-facilitating agent as claimed in claim 1, wherein the principal component consists of two or more groups of quick lime particles different in range of particle size from each other.

7. The statical demolition-facilitating agent as claimed in claim 5, wherein a group of the quick lime particles is in a content of 50 to 80% by weight and has a particle size of from 2.5 to 5 mm and another group of quick lime particles is in a content of 20 to 50% by weight and has a particle size of from 0.6 to 1.2 mm.

8. The statical demolition-facilitating agent as claimed in claim 1, wherein the principal component consists of two or more groups of quick lime particles different in apparent density or unit volume weight from each other.

9. The statical demolition-facilitating agent as claimed in claim 8, wherein a group of quick lime particles is in a content of 50 to 80% by weight and has an apparent density of from 1.3 to 1.6, and another group of quick lime particles is in a content of 20 to 50% by weight and has a bulk density of from 1.0 to 1.3.

10. The statical demolition-facilitating agent as claimed in claim 8, wherein a group of quick lime particles is in a content of 50 to 80% by weight and has a unit volume weight of 1.0 to 1.3 kg/l and another group of quick lime particles is in a content of 20 to 50% by weight and has a unit volume weight of 1.3 to 1.6 kg/l.

11. The statical demolition-facilitating agent as claimed in claim 1, wherein the rigid, porous inorganic grains are water-insoluble, exhibit a water-absorbing and desorbing property and have a bulk specific gravity of 1.0 or more.

12. The statical demolition-facilitating agent as claimed in claim 1, further consisting essentially of, in addition to the principal component, 0.01% to 2%, based on the weight of the principal component, of a water-absorbing organic material consisting of at least one water absorbing organic polymer material selected from the group consisting of acrylonitrile-grafted starches, polyacrylic acid resins, acrylic acid-grafted starches and cross-linked polyvinyl alcohol resins.

13. A statical demolition-facilitating agent consisting essentially of quick lime particles having inevitable impurities in a limited amount of 5% by weight or less, and having an apparent density of 2.0 or more, a unit volume weight of 1.0 kg/l or more, a particle size of 15 mm or less and an average particle size of 0.1 mm or more.

14. The statical demolition-facilitating agent as claimed in claim 13, wherein the quick lime particles consists of two or more groups of quick lime particles each having different particles sizes.

15. The statical demolition-facilitating agent as claimed in claim 14, wherein a group of the quick lime particles is in a content of 50 to 80% by weight and has a particle size of from 2.5 to 5 mm and another group of quick lime particles is in a content of 20 to 50% by weight and has and has a particle size of from 0.6 to 1.2 mm.

16. The statical demolition-facilitating agent as claimed in claim 13, wherein the quick lime particles consist of two or more groups of quick lime particles different in at least one of apparent density and unit volume weight from each other.

17. The statical demolition-facilitating agent as claimed in claim 16, wherein a group of quick lime particles is in a content of 50 to 80% by weight and has an apparent density of from 1.3 to 1.6, and another group of quick lime particles is in a content of 20 to 50% by weight and has a bulk density of from 1.0 to 1.3.

18. The statical demolition-facilitating agent as claimed in claim 1, wherein a group of quick lime particles is in a content of 50 to 80% by weight had has a unit volume weight of 1.0 to 1.3 kg/l and group of quick lime particles is in a content of 20 to 50% by weight and has a unit volume weight of 1.3 to 1.6 kg/l.

* * * * *

UNITED STATES PATENT AND TRADEMARK OFFICE
CERTIFICATE OF CORRECTION

PATENT NO. : 4,952,243

DATED : August 28, 1990

INVENTOR(S) : WAICHI KOBAYASHI et al.

It is certified that error appears in the above-identified patent and that said Letters Patent is hereby corrected as shown below:

Claim 1, column 13, line 46: delete "grains" and insert therefor --grain--.

Claim 2, column 13, line 54: between "an" and "component" insert --additional--; between "of" (second occurence) and "solid" delete --additional--.

Claim 4, column 13, line 67: between "an" and "component" insert --additional--; between "of" (second occurence) and "solid" delete --additional--.

Claim 4, column 14, line 4: delete "and" and insert therefor --,--.

Claim 14, column 14, line 63: delete "particles" and insert therefor --particle--.

UNITED STATES PATENT AND TRADEMARK OFFICE
CERTIFICATE OF CORRECTION

PATENT NO. : 4,952,243

DATED : August 28, 1990

INVENTOR(S) : Waichi Kobayashi, et al.

It is certified that error appears in the above-identified patent and that said Letters Patent is hereby corrected as shown below:

Claim 18, column 16, line 6: delete "had" and insert therefor --and--;

,line 7: between "and" and "group" insert --another--.

Signed and Sealed this

Thirty-first Day of March, 1992

Attest:

HARRY F. MANBECK, JR.

*Attesting Officer*  *Commissioner of Patents and Trademarks*